March 18, 1930. D. M. SOLENBERGER 1,751,253
PISTON RING
Original Filed April 16, 1923
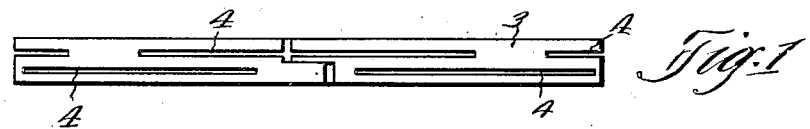
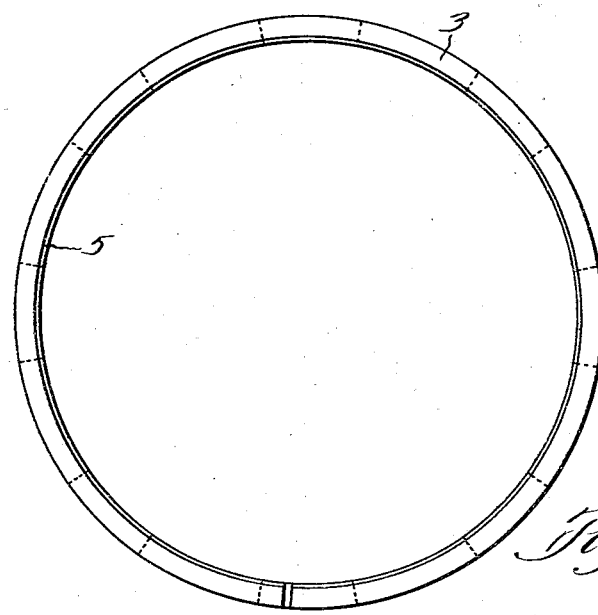
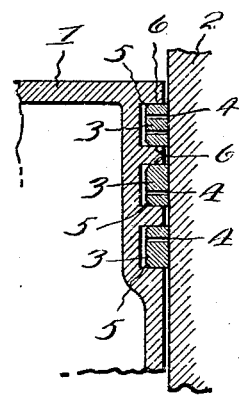
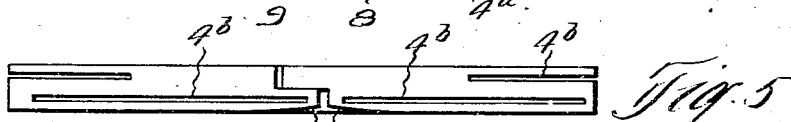
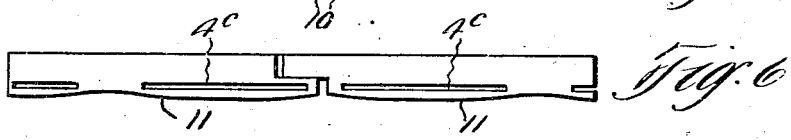
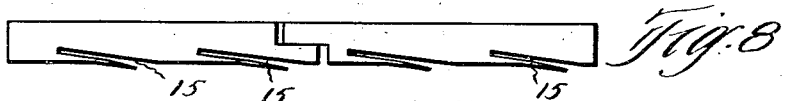
Inventor
D. M. Solenberger
By Hull, Brock & West
Attorney Patented Mar. 18, 1930

1,751,253

UNITED STATES PATENT OFFICE

DEAN M. SOLENBERGER, OF CLEVELAND, OHIO, ASSIGNOR TO THE SIMPLEX PISTON RING COMPANY OF AMERICA, INC., OF CLEVELAND, OHIO, A CORPORATION OF OHIO

PISTON RING

Application filed April 16, 1923, Serial No. 632,290. Renewed September 12, 1929.

This invention relates to a sealing ring for use in connection with a reciprocating element disposed within a cylinder, and has particular reference to a ring or rings for sealing the surface between a piston and the cylinder wall of an internal combustion engine, although equally well adapted for steam engines, pumps, and other analagous apparatus.

A great deal of trouble has been experienced in present day internal combustion engines due to what is commonly referred to as oil pumping. This is largely due to excessive wear between the upper and lower surfaces of the ring and the corresponding surfaces of the grooved seat in the piston. It has been found that as little as four-thousandths of an inch clearance between the ring and ring groove has resulted in sufficient oil reaching the firing chamber as to cause fouling of the spark plugs and carbonization of the valves to such an extent as to render the motor prac-. tically inoperative except for very short periods. This clearance in the ring groove permits a slight up and down motion of the piston ring which then functions as a pump and soon delivers an excessive amount of oil to the combustion chamber, the oil passing between the ring and the ring groove in the piston.

It is the general object of the present invention to provide a ring which shall form a tight seal at all times between the upper and lower surfaces of such ring and the corresponding surfaces of the ring groove in the piston, thus preventing reciprocatory motion between said ring and the piston.

Another object is to provide a ring of the aforesaid character which shall be devoid of springs or separable parts which require adjustment and skill in assembling.

Another object is to provide a ring which may be applied to worn ring grooves in the piston and which shall be self-adjusting within such grooves to form a tight seal therewith.

Another object is to provide a ring which shall be self-adjusting so as to be readily adapted to unevenly worn ring grooves, to form a tight seal at all points therewith.

A still further object is to provide a ring of the aforesaid character which shall be simple in construction, inexpensive to manufacture and which shall be easily applied and highly efficient in operation.

With these and other objects in view the invention consists in the various novel features of construction and arrangement or combination, all of which will be fully described hereinafter and pointed out in the appended claims.

In the accompanying drawing wherein I have shown certain illustrative forms of my invention but without intent to limit myself thereto. Fig. 1 is an elevation of a ring, constructed in accordance with my invention; Fig. 2 is a top plan view thereof; Fig. 3 is a detail view in section of a piston equipped with rings such as shown in Figs. 1 and 2; and Figs. 4-9 are elevations each representing a modified form of my invention.

Describing the various parts by reference characters, 1 denotes a piston which is reciprocable within a cylinder 2, and which is provided with rings 3 for sealing the surface between such piston and cylinder.

Each ring, as shown in Figs. 1 and 2, is of the split type and is provided with a plurality of slots 4. These slots are preferably formed in spaced circumferential relation adjacent the upper and lower peripheral edges of the ring, and the upper series of slots are preferably arranged in overlapping staggered relation with respect to the lower series of slots. A ring so formed may be compressed between the upper and lower edges thereof at any point, and such compression will be against the tension of the material forming such ring. I preferably slightly bevel the inner peripheral edges of the rings as indicated at 5 so that the rings may be applied to worn ring grooves which are sometimes shouldered due to excessive wear. This permits my improved ring to readily seat within the worn groove without binding on such shoulders. A ring formed in accordance with my invention is preferably made slightly greater in width than the width of the groove for which it is intended so that when the ring is applied to the piston it will be compressed and the resiliency of the ring material will at all times force said ring into tight contact with the upper and lower surfaces 6 of the ring groove. It will be obvious that a tight seal will be obtained at all points between the upper and lower surfaces of the ring and the corresponding surfaces of the ring groove. Should any wear take place between the ring and its groove, the natural resiliency of the ring, by virtue of the slots formed therein, will automatically take up such wear and prevent movement of the ring with respect to the piston.

These slots also serve as oil reservoirs, retaining a small quantity of lubricant therein which lubricates the cylinder wall and prevents undue wear with respect thereto.

In Fig. 4 I have shown a modified form of ring wherein the slots 4$^a$ terminate adjacent the step cut indicated at 8 without intersecting such cut. The overlapping surfaces of the cut are preferably rounded slightly as indicated at 9 so that the portion of the ring containing the step cut may be compressed sufficiently to enable the ring to fit snugly into the piston groove. With this type of ring there is no danger of breaking the slender slotted portion of the ring adjacent the step cut when placing it on the piston.

In Fig. 5 I have shown another modification wherein the slots 4$^b$ also terminate adjacent the step cut without intersecting such cut. In order to permit the ring to be compressed sufficiently at the cut to enter the ring groove, the abutting ends on one side of the ring may be ground to reduce the width thereof at this point, as indicated at 10. I preferably retain the minimum width of the ring equal to the width of the ring groove. In other words the width of the ring at the abutting ends thereof is substantially equal to the width of the ring groove in the piston, while the remaining portion of the ring is of a slightly greater width so that it will be compressed when inserted within the groove.

In Fig. 6 I have shown a modification which is particularly adapted for very narrow rings. In this type of ring I form only a single series of spaced circumferential slots 4$^c$ therein and form one edge of the ring with an indulating surface indicated at 11. The minimum width of this ring is intermediate adjacent slots and is preferably equal to the width of the ring groove, while the maximum width of the ring is at the slotted portions and is of a greater width than the ring groove so that this portion of the ring will be compressed when inserted in said groove.

In Fig. 7 I have shown a ring similar to that described in connection with Fig. 6 except that an auxiliary ring 12 is placed adjacent the undulating surface 11$^a$. In this type a seal is provided at all points between the upper and lower surfaces of the ring and the corresponding surfaces of the ring groove.

In Fig. 8 I have shown a ring provided along one edge thereof with a plurality of diagonally arranged slots 15 which intersect said edge. This arrangement also permits the ring to be compressed so as to be inserted within the ring groove under tension.

In Fig. 9 I have shown a still further modification wherein the ring is formed with a plurality of diagonally arranged slots 16 which do not intersect either edge thereof. The cut 17 in this instance is preferably arranged at substantially the same angle as the slots.

It will be obvious that I have provided a ring whose width is normally greater than the width of the ring groove and have so formed said ring as to permit it to be inserted within the groove under tension so that a snug fit is insured at all times between the upper and lower surfaces of the ring and the corresponding surfaces of the ring groove. It will also be obvious that I accomplish the foregoing results in a simple and efficient manner and without excessive parts such as springs which lose their tension under excessive heat.

It will be understood that the terms upper and lower as used in the specification and claims are used for convenience only, and that the piston and ring or rings thereon are equally well adapted for horizontal, angular or vertical movement.

Having thus described my invention, what I claim is:

1. A one piece piston ring having an upper and a lower circumferential series of slots, the said ring being provided with a stepped split joint comprising overlapping tongues, the slots in one series being staggered with respect to those in the other series, and one of the slots extending circumferentially across the joint and dividing one of said tongues into two portions.

2. A one piece piston ring having an upper and a lower circumferential series of slots, the said ring being provided with a split joint, the slots in one series being staggered with respect to those in the other series, and the inner circumferential edges of said ring being beveled.

3. A one piece piston ring having an upper and a lower circumferential series of slots, the said ring being provided with a split joint, the slots in one series being staggered with respect to those in the other series, one of said slots extending across said joint, and the inner circumferential edges of said ring being beveled.

In testimony whereof, I hereunto affix my signature.

DEAN M. SOLENBERGER.